United States Patent [19]

Taga et al.

[11] Patent Number: 5,264,238
[45] Date of Patent: Nov. 23, 1993

[54] METHOD FOR MANUFACTURING SNACK FOODS

[75] Inventors: Kazumitsu Taga, Neyagawa; Toshihiko Narukami, Ikoma; Misako Kawakado, Kashihara, all of Japan

[73] Assignee: House Food Industrial Co., Ltd., Higashi-Osaka, Japan

[21] Appl. No.: 41,878

[22] Filed: Apr. 2, 1993

Related U.S. Application Data

[63] Continuation of Ser. No. 714,017, Jun. 12, 1991, abandoned.

[30] Foreign Application Priority Data

Jun. 12, 1990 [JP] Japan ................. 2-153043

[51] Int. Cl.⁵ .................................. A23B 7/02
[52] U.S. Cl. ........................... 426/640; 426/634
[58] Field of Search ...................... 426/640, 634

[56] References Cited

U.S. PATENT DOCUMENTS

| | | | |
|---|---|---|---|
| 472,644 | 4/1892 | Saville | 426/640 |
| 592,906 | 11/1897 | Gere | 426/640 |
| 1,018,462 | 2/1912 | Warner | 426/640 |
| 1,090,255 | 3/1914 | Walsh et al. | 426/640 |
| 2,912,338 | 11/1959 | Barnes et al. | 426/640 |
| 3,134,683 | 5/1964 | Holahan et al. | 426/640 X |
| 3,506,447 | 4/1970 | Billerbeck et al. | 426/640 X |
| 3,940,505 | 2/1976 | Nappen et al. | 426/640 |
| 3,998,977 | 12/1976 | Rabeler | 426/640 X |
| 4,676,990 | 6/1987 | Huffman et al. | |
| 4,889,730 | 12/1989 | Roberts et al. | |

FOREIGN PATENT DOCUMENTS

| | | | |
|---|---|---|---|
| 1200523 | 7/1968 | Canada | |
| 860263 | 1/1971 | Canada | 426/640 |
| 1200523 | 7/1970 | United Kingdom | |
| 2163938 | 3/1986 | United Kingdom | |

OTHER PUBLICATIONS

*Handbuch der Lebensmittelchemie*, (1967), pp. 405–407, "Kohlenhydratreiche Lebensmittel", Lacker et al.

Primary Examiner—Joseph Golian
Attorney, Agent, or Firm—Oblon, Spivak, McClelland, Maier & Neustadt

[57] ABSTRACT

A method for manufacturing a snack food comprises the steps of preparing a paste of a ground or pulverized vegetable and/or fruit, the paste having a moisture content ranging from 50 to 85% by weight and a saccharide content ranging from 5 to 35% by weight, and then drying the paste to give a snack food having a moisture content ranging from 1 to 6% by weight and a bulk density ranging from 0.3 to 0.8 g/ml. The method can provide snack foods exhibiting palatability which has never been attained, mainly comprising vegetables and/or fruits, having a moisture content ranging from 1 to 6% and a bulk density ranging from 0.3 to 0.8 g/ml. The snack foods manufactured according to this method can be used as health confectionery after independently packaging or incorporating into a container.

12 Claims, No Drawings

METHOD FOR MANUFACTURING SNACK FOODS

This application is a continuation of application Ser. No. 07/714,017, filed on Jun. 12, 1991, now abandoned.

BACKGROUND OF THE INVENTION

The present invention relates to a method for manufacturing a health snack food in which a vegetable, fruit, bean or seaweed is used in a large amount as an ingredient.

There have been put on the market a variety of processed foods which make the most use of characteristic properties peculiar to ingredients such as a variety of vegetables and fruits, for instance, naturalness, fibrousness and favorableness for health. For instance, Japanese Unexamined Patent Publication (hereinafter referred to as "J. P. KOKAI") No. Sho 52-76450 discloses a method for preparing dried banana which comprises adding 5 to 100 parts by weight of water to 100 parts by weight of banana whose skin has been peeled off, rapidly mashing the banana and simultaneously admixing air bubbles to give a paste, freezing the paste and then subjecting the frozen paste to a vacuum freeze-drying process. Although this method makes it possible to give porous dried banana having any shapes, the resulting product is less crisp.

In addition, J. P. KOKAI No. Sho 50-6738 discloses a method for preparing ingredients for dried foods which comprises heating and boiling a vegetable such as a root vegetable or a fruit vegetable till it is sufficiently softened and then dehydrating the heated products. Moreover, J. P. KOKAI No. Sho 59-227264 discloses a method for preparing a vegetable pasta which comprises mixing water with a composition which comprises a vegetable, an alginate, propylene glycol alginate and a starch, then extruding the mixture into a pasta form and drying the pasta. Further, J. P. KOKAI No. Sho 54-145250 discloses a method for preparing a sheet-like food having a water content ranging from 4 to 15% which comprises adding water to an edible vegetable, grinding the mixture and finely macerating the bundled fibers thereof to give a uniform sheet-like product and then drying the same. However, these methods do not make the most use of the characteristic properties peculiar to the ingredients per se such as color and taste and texture of, for instance, a vegetable and the resulting product does not have sufficient crispness.

SUMMARY OF THE INVENTION

Accordingly, a primary object of the present invention is to provide a method for manufacturing a snack food having crispness which has never been attained without impairing the characteristic properties peculiar to a natural ingredient per se such as a vegetable, fruit and the like.

The present invention has been completed on the basis of the finding that the foregoing object can effectively be achieved if a snack food is prepared by mashing or grinding a natural ingredient selected from the group consisting of vegetables, fruits, beans and seaweeds to form a slurry or paste thereof, optionally adding a saccharide, to give a paste-like substance having a specific moisture content and a saccharide content, then forming the paste into a desired shape and drying the formed paste to give a snack food having a specific moisture content and a bulk density.

Other objects and features of the present invention will be apparent from the following description and examples.

Thus, the present invention relates to a method for manufacturing a snack food which comprises the steps of preparing a paste of a ground or pulverized natural ingredient selected from the group consisting of vegetables, fruits, beans and seaweeds having a moisture content ranging from 50 to 85% by weight and a saccharide content ranging from 5 to 35% by weight and then drying the paste to give a snack food having a moisture content ranging from 1 to 6% by weight and a bulk density ranging from 0.3 to 0.8 g/ml.

DESCRIPTION OF THE PREFERRED EMBODIMENTS

The present invention will be further explained in more detail below in conjunction with the following preferred embodiments.

Examples of the natural ingredients usable in the present invention are vegetables such as spinach, edible burdock, pumpkin, onion, cabbage and carrot; fruits such as apple, pineapple and banana; beans such as green peas and broad bean; and seaweeds such as undaria pinnatifida and tangle. These natural ingredients can be used as a mixture of two or more of these, but preferably used alone from the viewpoint of making use of characteristic properties such as color and taste and texture of each individual ingredient. These vegetables and the like are, if necessary, subjected to the removal of harshness and peeling off the skin and then mashed or pulverized before use. In the present invention, it is preferred to use ingredients which are mashed to such an extent that they can pass through a 5 mesh sieve.

In the method of the present invention, the foregoing natural ingredients are first formed into a paste having the following properties:

Moisture content: 50 to 85% by weight (hereinafter referred to as simply "%") and preferably 60 to 80%;
Saccharide content: 5 to 35% and preferably 10 to 25%.

In this respect, the mashed natural ingredients can optionally be dried while taking the amount of additives subsequently added to the mashed product so that the final moisture content thereof would fall within the range defined above. In other words, if the moisture content is outside the foregoing range, the molding properties of the resulting paste is impaired in cooperation with the saccharide content and accordingly a final snack food having a bulk density falling within the specific range cannot be manufactured. In addition, if the saccharide content which varies depending on the ingredients used is low, it is desirable to add a saccharide so that the final saccharide content of the product falls within the range defined above. In such case, it is preferred to use a variety of starches as the saccharide components to be supplemented. Moreover, particularly preferred starch is potato starch. To control the saccharide content of the final product to the specific range defined above is very important for imparting the crispness to the snack food finally obtained.

In the method of the present invention, the paste may optionally comprise a variety of proteins and oils and fats which can further improve the crispness and palatability of the snack food finally obtained from the paste. Examples of such proteins are egg white, soybean proteins and milk proteins and these proteins are preferably added to the paste so that the content thereof ranges from 1 to 5% on the basis of the total weight of the paste-like product. This is because if the protein content is outside of the range, the resulting snack food does not improve the crispness. On the other hand, examples of the oils and fats are butter, margarine, shortening and salad oil. These oils and fats are desirably added to the paste so that the content thereof ranges from 5 to 15% on the basis of the total weight of the paste-like product. These oils and fats are also added for the purpose of achieving the same effect as that achieved by the addition of the proteins.

The addition of a seasoning is not necessary in the method of the present invention, but a sweetner such as sugar may be added in such an amount that the total content of the saccharide falls within the range defined above. Moreover, other seasonings such as common salt can be added in a small amount.

When the foregoing paste-like product is prepared according to the method of the present invention, it is desirable that the content of the natural ingredients in the paste range from 50 to 100% and preferably 60 to 90% on the basis of the total weight of the paste. Thus, there can be prepared snack foods exhibiting characteristic properties peculiar to the starting materials such as taste, palatability and color. In addition, the resulting snack foods are excellent for use as health foods since they contain a large amount of the natural ingredients which are rich in fibrous substances and hence the fiber content thereof is also high.

In the method of the present invention, where vegetables, fruits or seaweeds are used as the natural ingredients, it is preferred to select the ingredients to be incorporated into the paste such that the hardness of the paste comprising the foregoing components is adjusted to a range of from 3 to 90 g. On the other hand, where beans are used as the natural ingredients, it is preferred to select the ingredients to be incorporated into the paste such that the hardness of the paste comprising the foregoing components is adjusted to a range of from 100 to 400 g. These results in the formation of a paste having good molding properties and thus the resulting paste can be formed into any shape such as sticks and sheets. In this respect, the hardness of the paste is determined using Fudow Rheometer NRM-2010J-CW (available from Fudow Co., Ltd.) under the following conditions: a meter sensitivity of 100 g; a set stress of 10; a sample-table speed of 30 cm/min; a sample volume of 50 ml (charged in a 100 ml volume beaker); an adapter used being a 10 mmΦ adapter for viscosity measurement; and a sample temperature of room temperature (20° to 24° C.).

In the method of the present invention, the paste-like substance thus obtained is then formed into any shape and thereafter heated to give a snack food having a moisture content ranging from 1 to 6% by weight, preferably 1 to 4% by weight and a bulk density ranging from 0.3 to 0.8 g/ml, preferably 0.3 to 0.5 g/ml. More specifically, the paste-like substance is formed into, for instance, a sheet-like product having a thickness ranging from 1 to 5 mm and then dried at a temperature ranging from 80° to 180° C. for 30 to 100 minutes. This drying process is preferably performed by first subjecting the molded product to high temperature drying in which the product is heated at 110° to 160° C. for 10 to 20 minutes and then to low temperature drying in which it is heated at a temperature ranging from 80° to 100° C. for 20 to 80 minutes. Thus, the molded paste is hardened while maintaining its shape during the first high temperature calcination and it is dried during the second low temperature calcination while maintaining the characteristic properties peculiar to the natural ingredients as the ingredients, such as color and taste. As a result, the method can make the most use of the characteristic properties of the ingredients without causing marked change in the taste due to the application of heat during the drying process.

A preferred embodiment of the present invention thus comprises the steps of preparing a paste of a ground or pulverized natural ingredients, the paste having a moisture content ranging from 60 to 80% by weight, a saccharide content ranging from 10 to 25% by weight, a hardness ranging from 3 to 90 g and a content of the natural ingredients ranging from 50 to 100% by weight, then forming the paste into a shape and drying the paste by first subjecting it to high temperature drying performed at 110° to 160° C. for 10 to 20 minutes and then to low temperature drying performed at 80° to 100° C. for 20 to 80 minutes to give a snack food having a moisture content ranging from 2 to 4% and a bulk density ranging from 0.3 to 0.5 g/ml.

According to the method of the present invention, there can be provided snack foods exhibiting excellent palatability which has never been attained, mainly comprising a vegetable and the like, having a moisture content ranging from 1 to 6% and a bulk density ranging from 0.3 to 0.8 g/ml.

Thus, the snack foods manufactured according to the method of the present invention can variously be put on the market as health confectionery by independently packaging or incorporating into a container.

The present invention will hereinafter be described in more detail with reference to the following working examples, but the present invention is by no means restricted to these specific examples.

EXAMPLE 1

Spinach was boiled in a boiled 1% aqueous common salt solution, then drained and ground to give a paste. Thereafter, the paste was dried at 50° C. till the moisture content thereof reached about 83%. Then 1 g of sugar, 0.2 g of common salt, 10 g of potato starch, 10 g of egg and 5 g of white sesame were added to and uniformly mixed with 42 g of the resulting paste to give a paste-like substance having a moisture content of 61%, a saccharide content of 16%, a protein content of 1.8% and a hardness of 64 g. The paste-like substance was squeezed into sticks having a width of about 6 mm, a height of about 6 mm and a length of about 10 cm, then heated to 150° C. for 10 minutes to dry the same and further heated to 100° C. for 40 minutes to give a snack food containing a large amount of spinach (having a moisture content of 2% and a bulk density of 0.4 g/ml).

EXAMPLE 2

The skin of edible burdock was peeled off, the edible burdock was cut into pieces having a length of about 10 cm, subjected to the removal of harshness by immersing the pieces in a 2% by weight aqueous vinegar solution, then sufficiently boiled till it became sufficiently soft, drained and pulverized to give a paste. Then 3 g of sugar, 0.3 g of common salt, 6 g of potato starch and 6 g of egg were added to and uniformly mixed with 55 g of the resulting paste (the resulting product had a moisture content of 68%, a saccharide content of 25%, a protein content of 1% and a hardness of 64 g). The resulting mixture was squeezed into sticks having a width of about 6 mm, a height of about 6 mm and a length of about 10 cm, then heated to 150° C. for 12 minutes to dry the same and further heated to 100° C. for 40 minutes to give a snack food containing a large amount of edible burdock (having a moisture content of 2% and a bulk density of 0.3 g/ml).

EXAMPLE 3

Onion was cut in round slices, introduced into hot water to boil for about 20 minutes to thus weaken the sharp taste and the irritating smell of the onion. Thereafter, the boiled onion slices were drained, then mashed to give a paste and the paste was boiled down till the moisture content thereof reached about 89%. Then 0.2 g of common salt and 6 g of potato starch were added to and uniformly mixed with 55 g of the resulting paste (the resulting product had a moisture content of 82%, a saccharide content of 16% and a hardness of 10 g). The resulting mixture was squeezed into sticks having a width of about 6 mm, a height of about 6 mm and a length of about 10 cm, then heated to 150° C. for 12 minutes to dry the same and further heated to 100° C. for 40 minutes to give a snack food containing a large amount of onion (having a moisture content of 3% and a bulk density of 0.4 g/ml).

EXAMPLE 4

After removing the skin of carrot and pulverizing it to give a paste-like substance, the paste was squeezed to such a yield that 100 g of the paste was reduced to 40 g for weakening the smell peculiar thereto. Then 6 g of sugar, 0.2 g of common salt and 6 g of potato starch were added to and uniformly mixed with 55 g of the resulting paste (the resulting product had a moisture content of 60%, a saccharide content of 22% and a hardness of 15 g). The resulting mixture was squeezed into sticks having a width of about 6 mm, a height of about 6 mm and a length of about 10 cm, then heated to 150° C. for 12 minutes to dry the same and further heated to 100° C. for 40 minutes to give a snack food containing a large amount of carrot (having a moisture content of 2% and a bulk density of 0.5 g/ml).

EXAMPLE 5

After removing the skin of banana and boiling the same so that the central portion thereof was maintained at 70° C. for not less than 5 minutes to thus deactivate the oxidases present therein, the banana was mashed to give a paste. Separately, 6 g of butter was softened by bringing its temperature back to room temperature, 3 g of sugar was added to and mixed with the butter and further 6 g of egg was gradually added to and mixed with the resulting mixture. The mixture thus prepared was added to and uniformly mixed with 55 g of the foregoing banana paste (the resulting product had a moisture content of 60%, a saccharide content of 21%, a protein content of 1% and a oils and fats content of 7%). The resulting mixture was squeezed into sticks having a width of about 6 mm, a height of about 6 mm and a length of about 10 cm, then heated to 150° C. for 10 minutes to dry the same and further heated to 100° C. for 60 minutes to give a snack food containing a large amount of banana (having a moisture content of 4% and a bulk density of 0.4 g/ml).

EXAMPLE 6

After removing the skin and the core of apple, cutting into proper pieces and immersing them in a 1% by weight aqueous common salt solution, the pieces were drained, followed by the addition of 0.1% by weight of common salt thereto for preventing the browning thereof and the pulverization of the mixture to give a paste of apple. Thereafter, the paste was boiled down to a moisture content of about 77% by weight. Separately, 6 g of butter was softened by bringing its temperature back to room temperature, 2 g of sugar was added to the butter and sufficiently mixed together and further 6 g of egg was gradually added to and mixed with the resulting mixture. To the mixture thus prepared, there were added 55 g of the foregoing apple paste and 6 g of potato starch and these ingredients were uniformly mixed together (the resulting product had a moisture content of 64%, a saccharide content of 26%, a protein content of 1% and a oils and fats content of 6.6%). The resulting mixture was squeezed into sticks having a width of about 6 mm, a height of about 6 mm and a length of about 10 cm, then heated to 150° C. for 10 minutes to dry the same and further heated to 100° C. for 60 minutes to give a snack food containing a large amount of apple (having a moisture content of 3% and a bulk density of 0.5 g/ml).

EXAMPLE 7

Dried undaria pinnatifida (wakame) was immersed into water to reconstitue into an original state, then drained and ground to give a paste. On the other hand, 6 g of shortening and 1 g of sugar were mixed, after which 6 g of egg was added thereto. 40 g of the paste of undaria pinnatifida and 6 g of potao starch were added to the resultant mixture and mixed uniformly to give a paste like substance having a moisture content of 73%, a saccharide content of 11%, a protein content of 3% and a hardness of 23 g. The paste-like substance was squeezed into sticks having a width of about 6 mm, a height of about 6 mm and a length of about 10 cm, then heated to 150° C. for 10 minutes to dry the same and further heated to 100° C. for 40 minutes to give a snack food containing a large amount of undaria pinnatifida (having a moisture content of 2% and a bulk density of 0.6 g/ml).

EXAMPLE 8

Pods of broad beans were taken out and immersed into hot water to boil them for about 10 minutes. The thus boild broad beans were peeled off and and ground to give a paste. Then 0.2 g of common salt and 6 g of potato starch were added to and uniformly mixed with 55 g of the resulting paste to give a paste-like substance having a moisture content of 65%, a saccharide content of 23%, a protein content of 9% and a hardness of 310 g. The paste-like substance was squeezed into sticks having a width of about 6 mm, a height of about 6 mm and a length of about 10 cm, then heated to 150° C. for 12 minutes to dry the same and further heated to 100° C. for 30 minutes to give a snack food containing a large amount of broad beans (having a moisture content of 3% and a bulk density of 0.4 g/ml).

What is claimed is:

1. A method for manufacturing a snack food comprising the steps of preparing the paste of a ground or pulverized natural ingredient selected from the group consisting of vegetables, fruits, beans and seaweeds, the paste having a moisture content ranging from 50 to 85% by weight, a protein content ranging from 1 to 5% by weight, a fat and oil content ranging from 5 to 15% by weight, and a saccharide content ranging from 5 to 35% by weight, on the basis of the total weight of the paste, and then drying the paste to give a snack food having a moisture content ranging from 1 to 6% by weight and a bulk density ranging from 0.3 to 0.8 g/ml, wherein the paste is dried by first subjecting the paste to high temperature drying at 110° to 160° C. for 10 to 20 minutes and then to low temperature drying at a temperature ranging from 80° to 100° C. for 20 to 80 minutes.

2. The method of claim 1 wherein the content of the natural ingredient in the paste ranges from 50 to 100% by weight on the basis of the total weight of the paste.

3. The method of claim 1 wherein the moisture content of the paste ranges from 60 to 80% by weight on the basis of the total weight of the paste.

4. The method of claim 1 wherein the saccharide content of the paste ranges from 10 to 25% by weight on the basis of the total weight of the paste.

5. The method of claim 1 wherein the snack food has a bulk density ranging from 0.3 to 0.5 g/ml.

6. The method of claim 1 wherein the paste is formed into a shape prior to the drying process.

7. The method of claim 1 wherein the vegetable is selected from the group consisting of spinach, edible burdock, pumpkin, onion, cabbage and carrot and the fruit is selected from the group consisting of apple, pineapple and banana.

8. The method of claim 1 wherein the bean is selected from the group consisting of green peas and broad bean and the seaweed is selected from the group consisting of undaria pinnatifida and tangle.

9. The method of claim 1 wherein the ingredient is ground or pulverized to an extent that the resulting paste can pass through a 5 mesh sieve.

10. The method of claim 1 wherein the paste is dried by heating it to a temperature ranging from 80° to 180° C. for 30 to 100 minutes.

11. The method of claim 1 wherein the hardness of the paste is controlled to the range of from 3 to 90 g in case where the natural ingredient is selected from the group consisting of vegetable, fruit and seaweeds.

12. The method of claim 1, wherein the natural ingredient is selected from the group consisting of spinach, edible burdock, pumpkin, onion, cabbage, carrot, apple, pineapple, banana, green peas, broad beans, undairia pinnitifida and tangle.

* * * * *